United States Patent [19]
Buchner

[11] 3,983,794
[45] Oct. 5, 1976

[54] MULTISTEP TRANSVERSE WELDING PROCESS FOR PRODUCING BAGS FROM PLASTIC SHEETS

[75] Inventor: Norbert Buchner, Tamm, Germany

[73] Assignee: Robert Bosch G.m.b.H., Stuttgart, Germany

[22] Filed: Oct. 17, 1974

[21] Appl. No.: 515,692

[30] Foreign Application Priority Data
Oct. 19, 1973 Germany............................ 2352528

[52] U.S. Cl. .................................. 93/35 R; 93/8 R; 93/DIG. 1; 156/290
[51] Int. Cl.² ........................................ B31B 23/06
[58] Field of Search ................ 93/35 R, 33 H, 33 R, 93/8 R, DIG. 1; 156/211, 290, 306; 229/53, 69

[56] References Cited
UNITED STATES PATENTS

| | | | |
|---|---|---|---|
| 2,320,326 | 5/1943 | Avery | 93/33 H |
| 2,649,674 | 8/1953 | Bartelt | 93/DIG. 1 |
| 3,552,278 | 1/1971 | Guenther | 93/35 R |
| 3,553,934 | 1/1971 | Johnson et al. | 93/35 R |
| 3,692,608 | 9/1972 | Risgaard | 156/290 X |

Primary Examiner—James F. Coan
Attorney, Agent, or Firm—Edwin E. Greigg

[57] ABSTRACT

A process and a device for producing bags from a strip of thermoplastic material wherein mated layers of foil strip are supplied to serially arranged bonding devices to provide bonded seams extending over the width of the layers at specific intervals corresponding to the width of the bags with said bonding devices being alternated with cooling means to lower the temperature of the bonded areas and thereafter advancing the material to a cutting device designed to separate the bags divided by the bonded seams from the chain of bags produced by the bonding operation.

6 Claims, 2 Drawing Figures

MULTISTEP TRANSVERSE WELDING PROCESS FOR PRODUCING BAGS FROM PLASTIC SHEETS

BACKGROUND OF THE INVENTION

Devices for producing bags from a foil strip are already known wherein the foil strip is folded along its center line to form a half tube such that the two halves are mated with each other. The two layers are then connected together by means of transverse bonded seams and individual bags can be separated in succession from the chain of bags thus formed. An advancing device is provided between the bonding device and the separating device so as to move the foil strip between these two devices. The advancing device pulls the foil strip in the region in front of and after the bonding device and only pushes the end of the strip in the region of the separating device. With devices of this type it is possible to process packing materials comprising a supporting layer and an inner heat sealing layer into bags without any difficulty. However, if thermoplastic packing materials are being processed which become soft or melt along their entire cross-section at the necessary bonding temperature, it is only possible to use the process employing the known devices if the bonded seams have cooled sufficiently before pulling stresses are applied by the advancing device so that they do not rip or stretch. This problem can generally be solved by employing a heat pulse bonding process wherein the seam regions are not only heated to the bonding temperature but are also cooled to a large extent. A disadvantage of using this heat pulse bonding process consists in that the device has a very low capacity because, in addition to the bonding and transporting time, additional time is required to cool the bonded seams. The thicker the packing material, the greater the drop in output.

To obviate this disadvantage, the Auslegeschrift No. 1,484,982 proposed a pair of endless conveyor belts, the belt sections of which are turned towards each other and support the foil layers with respect to the bonding and cooling elements and through which the bonding heat is transferred to the packing material. A device of this type is costly and still does not have the capacity which can be obtained with the above-described devices when using multi-layer packing materials, as heat must be transferred through the conveyor belt onto the packing material.

OBJECT OF THE INVENTION

The object of the present invention is to provide a process for producing bags from plastic sheeting, this process being designed to enable high output capacities to be obtained.

According to the invention this object is achieved by firstly only bonding together the foil layers at the point where the bonded seam is to be formed over a part of the width of the layers and thereafter bonding the remaining part of the foil layers after the first part has become firmer.

The process according to the present invention has the advantage that the foil strip or the foil layers can be pulled directly to the subsequent processing point without tearing or stretching the bonded connection, as the part of the seam which has not been weakened by the influence of heat and which has been cooled down has sufficient strength to be moved forward.

In a further development of the invention it has been found advantageous for the center region of the foil layers to be bonded first and thereafter the edge regions thereof.

A device for effecting the process according to the invention which comprises a bonding device and a separating device disposed on a path of movement of the foil layers is characterized in that the bonding device possesses a plurality of bonding elements disposed in succession in the direction of movement of the foil strip. One of these bonding elements extends over a part of the width of the foil layers and the other extends over the remaining part of the width of the foil layers.

If, in further developing the device according to the invention, a cooling element is disposed in series with each bonding element of the bonding device, the system is provided with a compact structure having perfect operational characteristics in addition to its high delivery capacity.

Other objects, features and advantages of the present invention will be made apparent in the following detailed description of an embodiment thereof which is provided in reference to the accompanying drawings.

DESCRIPTION OF THE PREFERRED EMBODIMENT

Figure 1:
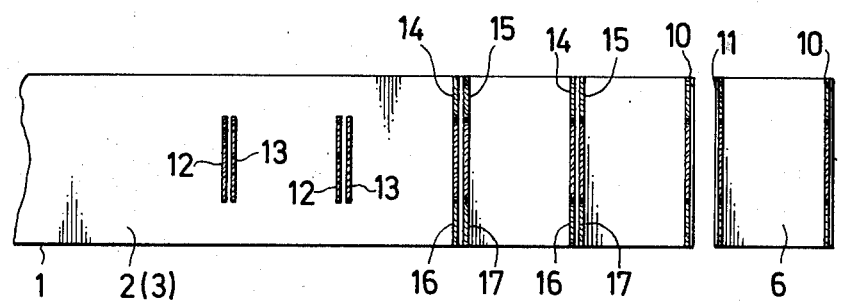
FIG. 1 shows a side elevational view of a doubled foil strip comprising transverse bonded seams.

The foil strip 1 consisting of thermoplastic material, for example, polyethylene, is folded along its length about its center line, thus producing a half tube having two mated layers 2, 3. The two layers 2, 3, are bonded together along the seams 10, 11, extending at right angles to the direction of the strip and the spacing of these seams corresponding to the width of the respective bag 6 to be produced. The first bag 6 is separated from the chain of bags thus produced by cutting the layers in the region between the several bonded areas which form spaced seams.

To ensure that the foil strip 1 which only consists of a single layer and thus does not comprise a supporting layer possesses sufficient strength to be moved forward after heat has been applied in the region of the bonded seams 10, 11, the foil layers 2, 3, are not directly subjected to the action of heat over their entire width during a bonding operation but only a predetermined area 12, 13, of the length of the bonded seam 10, 11, is first produced and when this part has gained more strength through being cooled, the remaining part 14, 15; 16, 17, is then bonded at which time the individual bags can be produced by a suitable severing operation.

Preferably, a predetermined area 12, 13, of the bonded seams 10, 11, in the center or medial region of the juxtaposed foil layers 2, 3, is first bonded and the remaining parts 14, 15; 16, 17, in the end zones of the seams are then bonded when the first area has cooled and gained sufficient strength to be pulled along by its length. However, the process can be reversed and the edge zones can be bonded first and the center region thereafter.

It is also possible to divide the overall length of a bonded seam into more than three sections and in each of two bonding stages to subject the two sections which are not directly adjacent to each other to the action of pressure and heat. When the length of the bonded seam is divided into more than three sections, these sections can be bonded in more than two bonding stages.

In a suitable device for effecting the above-described process, the foil strip 2 is advanced — always by the width of a bag 6 to be produced — by a delivery spool 4 for folding the strip lengthwise about a folding wedge 20 and through the gap in the guide fork 21 by a pair of advancing rollers 22. Two pairs of juxtaposed bonding dies 23, 24, are disposed in alignment ahead of the opposed pairs of advancing rollers 22 at a distance of two bag widths in the direction of movement of the foil strip 1 with its mated layers 2, 3. A pair of cooling dies 25, 15, for acting on the foil strip 1 are arranged in series with each of these pairs of bonding dies 23, 24, at a spacing of about one bag width. The bonding dies 23, 24, possess staggered ribs 27, 28, which extend toward the foil strip and are disposed in parallel at right angles to the direction of movement of the strip. One of these ribs is designed to produce the right side seam 10, 11, and the other, the left side seam of the bag 6.

The length of the ribs 27 of the first pair of bonding dies 23 does not extend over the entire width of the foil layers 2, 3, but only over a predetermined area thereof. When the bonding dies 23 are pressed against the foil layers 2, 3, the ribs 27 preferably only touch their center regin 12, 13, over a zone corresponding to about half the width of the foil layers 2, 3. The second pair of bonding dies 24 are used to bond the remaining edge sections of the foil layers 2, 3 but not until the strip is suitably cooled to lower its temperature and to prevent tearing when the advancing rolls 22 are in operation. The ribs 28 of this pair of bonding dies 24 are interrupted in the center zone such that when the bonding dies 24 are pressed against the foil layers 2, 3, they touch their end zones 14, 15; 16, 17. The length of the individual sections of these ribs 28 is slightly more than a quarter of the width of the foil layers 2, 3, so that they just overlap the parts 12, 13 of the bonded seam 10, 11, produced by the ribs 27.

When the bonding dies 23, 24, which are located at sppaced stations lengthwise of the strip, are pressed against the foil layers 2, 3, during which time the two advancing rollers 22 are immobile, heat is then transferred by way of the ribs 27, 28, to the oppositely disposed faces of the foil layers 2, 3, which are suitably softened so as to be able to be fused together. As long as the connecting zones are still hot, the foil layers only have a minimal breaking strength at these points. However, as the connecting zones produced during each bonding operation do not extend over the entire width of the foil layers 2, 3, the layers 2, 3, retain sufficient strength for the foil strip 1 to be advanced longitudinally by a single stage by the pair of advancing rollers 22, directly after the bonding dies 23, 24, have been returned to an inoperative position out of contact with the foil layers 2, 3.

Figure 2:
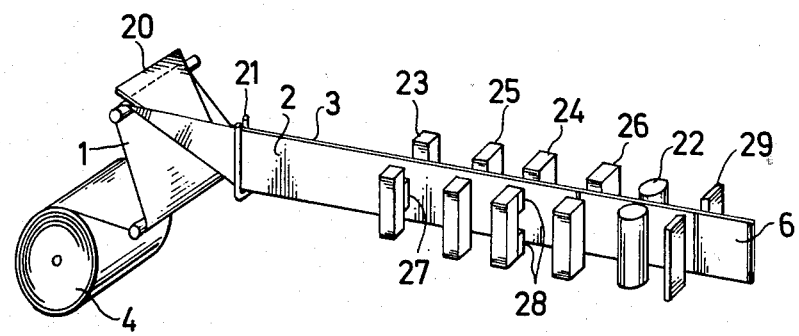
FIG. 2 is a simplified diagrammatic view of a device for producing the bags.

A pair of longitudinally aligned opposed cooling dies 25—25 are positioned substantially one bag length from the first set of bonding dies 23 for the rapid cooling of the first bonded zone. After the first bonded area of the bag has cooled it is moved to the next station whereupon the second set of bonding dies are advanced toward one another to engage the bag to perform the second seal, which as shown in FIG. 2, straddles the first zone created by dies 23. The rollers 22 then advance the bag to the next station for the cooling operation which is performed by the second set of cooling dies, i.e., 26—26. The second set of cooling dies 26—26 which are pressed against the parts 12-17 of the bonded seams 10, 11, which are still hot, are thus cooled and strengthened during the subsequent rest period of the pair of advancing rollers 22. The final station includes a cutting device 29 comprising suitable shearing means disposed in series with and beyond the pair of advancing rollers 22. This device 29 is adapted to cut the foil layers 2, 3, between two adjacent bonded seams 10, 11, thus separating a finished bag 6 from the length of folded foil. The bags which have been produced in this way can be stacked or supplied to a conveyor which supplies them to a filling and closing device.

In the above-described embodiment, the bonding dies 23, 24, each possess two ribs 27, 28, such that adjacent bonded seams 10, 11, spaced slightly apart from each other and belonging to two different adjacent bags can be prepared simultaneously. It is also possible to produce only a single bonded seam, the width of which corresponds to approximately the width of the two bonded seams 10, 11, and this seam can then be slit along its length when separating the bags.

The ribs 27, 28, of the bonding dies 23, 24, are narrower at their ends to prevent the bonded seam sections from overlapping each other in the course of a rapid forward movement which might displace the individual seam zones as a result of some irregularity of the conveyor or a correction on the part of the register control means.

I claim:

1. The method of incrementally forming bags seriatim comprising the steps of:
 a. feeding parallel disposed juxtaposed homogeneous thermoplastic strip material to a first bonding station;
 b. subjecting opposed sides of the strip material to heat and pressure thereby bonding a first predetermined transversely limited area of the strip material;
 c. advancing the strip material at least one bag length;
 d. cooling the bonded area of the incrementally advanced strip material;
 e. feeding the strip material to a second bonding station to subject the same to heat and pressure to further bond the remaining transverse area of the strip material left unbonded in step (b) and, thereafter
 f. cooling the final bonded area.

2. The method according to claim 1, the further step of severing the advancing strip material into individual bags subsequent to cooling the second bonded area.

3. The method according to claim 1, the further step of first
 a. bonding the strip material by a first set of dies in a limited area medially of its transverse extent and, thereafter;
 b. contacting the strip material with a second set of dies capable of straddling the initially bonded zone to perform the second bonding operation.

4. The method according to claim 1, the further step of
 a. applying the first and second bonded areas in parallel spaced transversely extending zones and, thereafter;
 b. severing the bags from the length of strip material between the parallel spaced zones.

5. The method according to claim 1, the further step of
a. folding a running length of strip material transversely of its longitudinal extent to provide coextensive edge portions and, thereafter;
b. alternately bonding and cooling the folded strip to produce open ended individual separable bags.

6. The method of incrementally forming bags seriatim comprising the steps of:
a. juxtaposing parallel strips of homogeneous thermoplastic strip material;
b. thermally welding a first predetermined transversely limited area of the strip material;
c. cooling the first predetermined transversely limited area of the strip material;
d. thermally welding an area that is correlated with said first welded area to complete the transverse welded area, and thereafter
e. cooling the final welded area.

* * * * *